United States Patent
Liu et al.

(10) Patent No.: US 12,531,386 B2
(45) Date of Patent: Jan. 20, 2026

(54) FIBER LASER SYSTEM WITH MULTIPLE WAVELENGTHS

(71) Applicant: Lumentum Operations LLC, San Jose, CA (US)

(72) Inventors: Ning Liu, Morgan Hill, CA (US); Xiang Peng, San Ramon, CA (US)

(73) Assignee: Lumentum Operations LLC, San Jose, CA (US)

( * ) Notice: Subject to any disclaimer, the term of this patent is extended or adjusted under 35 U.S.C. 154(b) by 949 days.

(21) Appl. No.: 17/657,426

(22) Filed: Mar. 31, 2022

(65) Prior Publication Data

US 2023/0246407 A1 Aug. 3, 2023

Related U.S. Application Data

(60) Provisional application No. 63/267,251, filed on Jan. 28, 2022.

(51) Int. Cl.

| | |
|---|---|
| *H01S 3/00* | (2006.01) |
| *H01S 3/067* | (2006.01) |
| *H01S 3/08* | (2023.01) |
| *H01S 3/30* | (2006.01) |

(52) U.S. Cl.
CPC ........ *H01S 3/08086* (2013.01); *H01S 3/0675* (2013.01); *H01S 3/06754* (2013.01); *H01S 3/302* (2013.01)

(58) Field of Classification Search
CPC .............. H01S 3/08086; H01S 3/0675; H01S 3/06754; H01S 3/302
See application file for complete search history.

(56) References Cited

U.S. PATENT DOCUMENTS

| | | | | |
|---|---|---|---|---|
| 5,323,404 | A * | 6/1994 | Grubb | H01S 3/0675 |
| | | | | 359/345 |
| 5,666,372 | A * | 9/1997 | Ball | H01S 3/0675 |
| | | | | 372/102 |
| 6,275,511 | B1 * | 8/2001 | Pan | H01S 5/146 |
| | | | | 372/101 |
| 11,870,203 | B2 * | 1/2024 | Zediker | H01S 3/302 |
| 2014/0254614 | A1 * | 9/2014 | Nicholson | H04J 14/0307 |
| | | | | 372/3 |

OTHER PUBLICATIONS

Jin et al., "High-power dual-wavelength Hodoped fiber laser at >2 µm tandem pumped by a 1.15 µm fiber laser," Scientific Reports, Published Feb. 9, 2017, 6 Pages.

* cited by examiner

*Primary Examiner* — Mark Hellner
(74) *Attorney, Agent, or Firm* — Harrity & Harrity, LLP (57) ABSTRACT

In some implementations, a fiber amplifier system includes a fiber oscillator and a fiber amplifier coupled to an output end of the fiber oscillator. The fiber oscillator may include an active fiber having a first end and a second end, where the active fiber is to receive pump light from one or more optical sources; one or more high-reflectivity mirrors coupled to the first end of the active fiber; and multiple output coupler mirrors coupled to the second end of the active fiber. The one or more high-reflectivity mirrors and the multiple output coupler mirrors may form an optical cavity with the active fiber for generating laser light. The multiple output coupler mirrors may have respective center wavelengths that are different. The multiple output coupler mirrors may have respective reflection spectrums that are different.

20 Claims, 5 Drawing Sheets

FIBER LASER SYSTEM WITH MULTIPLE WAVELENGTHS

CROSS-REFERENCE TO RELATED APPLICATION

This Patent application claims priority to U.S. Provisional Patent Application No. 63/267,251, filed on Jan. 28, 2022, and entitled "HIGH POWER FIBER LASER WITH MULTIPLE WAVELENGTHS." The disclosure of the prior Application is considered part of and is incorporated by reference into this Patent Application.

TECHNICAL FIELD

The present disclosure relates generally to a fiber oscillator and to a fiber laser system with multiple wavelengths.

BACKGROUND

Fiber lasers provide significant advantages of efficiency and practicality in comparison with other laser types such as free-space lasers. In fiber lasers and amplifiers, light is guided by an "active" fiber core typically doped with ions of a rare-earth element, such as ytterbium, which provides optical gain. The guiding property of the doped fiber core considerably relaxes requirements of optical alignment. It also allows increases to the length of the gain medium to tens and even hundreds of meters, resulting in very high achievable optical gains.

SUMMARY

In some implementations, a fiber amplifier system includes a fiber oscillator and a fiber amplifier coupled to an output end of the fiber oscillator. The fiber oscillator may include an active fiber having a first end and a second end, where the active fiber is to receive pump light from one or more optical sources; one or more high-reflectivity mirrors coupled to the first end of the active fiber; and multiple output coupler mirrors coupled to the second end of the active fiber. The one or more high-reflectivity mirrors and the multiple output coupler mirrors may form an optical cavity with the active fiber for generating laser light. The multiple output coupler mirrors may have respective center wavelengths that are different. The multiple output coupler mirrors may have respective reflection spectrums that are different.

In some implementations, a fiber oscillator includes an active fiber having a first end and a second end, where the active fiber is to receive pump light from one or more optical sources; a high-reflectivity mirror coupled to the first end of the active fiber; and multiple output coupler mirrors coupled to the second end of the active fiber. The high-reflectivity mirror and the multiple output coupler mirrors may form an optical cavity with the active fiber. The multiple output coupler mirrors have respective center wavelengths that are different, and the high-reflectivity mirror may have a reflection spectrum that includes respective reflection spectrums of the multiple output coupler mirrors.

In some implementations, a fiber oscillator includes an active fiber having a first end and a second end, where the active fiber is to receive pump light from one or more optical sources; one or more high-reflectivity mirrors coupled to the first end of the active fiber; and multiple output coupler mirrors coupled to the second end of the active fiber. The one or more high-reflectivity mirrors and the multiple output coupler mirrors may form an optical cavity with the active fiber, where the optical cavity is to generate a signal that is to have a total optical power that is distributed into multiple different center wavelengths, and where respective optical powers of signals of the multiple different center wavelengths are individually to be below a corresponding stimulated Raman scattering (SRS) threshold, and the total optical power is to be above an SRS threshold of any one of the multiple different center wavelengths.

DETAILED DESCRIPTION

The following detailed description of example implementations refers to the accompanying drawings. The same reference numbers in different drawings may identify the same or similar elements.

Stimulated Raman scattering (SRS) may be detrimental to the operation of a high power fiber laser, resulting in lower efficiency, additional heating of the fiber, and poor performance in various applications. SRS may occur for a fiber laser when an optical power of the laser exceeds a threshold for SRS. Thus, improvements to the optical power of fiber lasers may be constrained by the threshold for SRS. Similarly, reducing SRS generation may facilitate increases to the optical power of fiber lasers. In some cases, SRS generation may be suppressed or reduced by reducing a laser's fiber length and/or by reducing a power density in the fiber core. However, such techniques may be insufficient for achieving acceptably high optical power and/or high beam brightness.

Some implementations described herein provide a fiber oscillator (e.g., a fiber laser or a seed fiber laser) and a laser system that lases at multiple wavelengths. In particular, the fiber oscillator is configured to generate a signal having an optical power that is distributed into multiple different center wavelengths. In this way, SRS generation may be suppressed (e.g., if the optical powers of the constituent signals of multiple wavelengths individually do not exceed an SRS threshold), thereby enabling the fiber oscillator and the laser system to achieve high optical power and/or brightness. The fiber oscillator may be associated with an optical power in a range from several hundred watts (e.g., 200 watts, 300 watts, 400 watts, or the like) to one or more kilowatts (e.g., 2 kilowatts, 3 kilowatts, 4 kilowatts, 10 kilowatts, or the like).

In some implementations, the fiber oscillator includes one or more wavelength-selective high-reflectivity mirrors, multiple wavelength-selective output coupler mirrors, and an active fiber between the high-reflectivity mirror(s) and the output coupler mirrors. That is, the high-reflectivity mirror(s) may be coupled to a first end of the active fiber, and the output coupler mirrors may be coupled to a second end of the active fiber, to form an optical cavity with the active fiber. The multiple output coupler mirrors may be configured with different center wavelengths. In some implementations, the respective reflection spectrums of the output coupler mirrors are non-overlapping.

In some implementations, a fiber oscillator system may include multiple fiber oscillators configured to operate at different wavelengths. For each fiber oscillator, a high-reflectivity mirror may be coupled to a first end of an active fiber, and an output coupler mirror may be coupled to a second end of the active fiber, to form an optical cavity. In some implementations, active fibers of the multiple fiber oscillators may be pumped by respective optical sources or by the same optical source.

In some implementations, the fiber oscillator or fiber oscillator system described herein may be a seed laser in a fiber amplifier system. For example, an output end of the fiber oscillator or fiber oscillator system may be coupled to a fiber amplifier. In this way, the fiber amplifier system may have a reduced SRS and a high optical power. The fiber amplifier system may be associated with an optical power in a range from several kilowatts (e.g., 2 kilowatts, 3 kilowatts, 4 kilowatts, or the like) to tens of kilowatts (e.g., 20 kilowatts, 30 kilowatts, 40 kilowatts, 50 kilowatts, 100 kilowatts, or the like).

Figure 1:
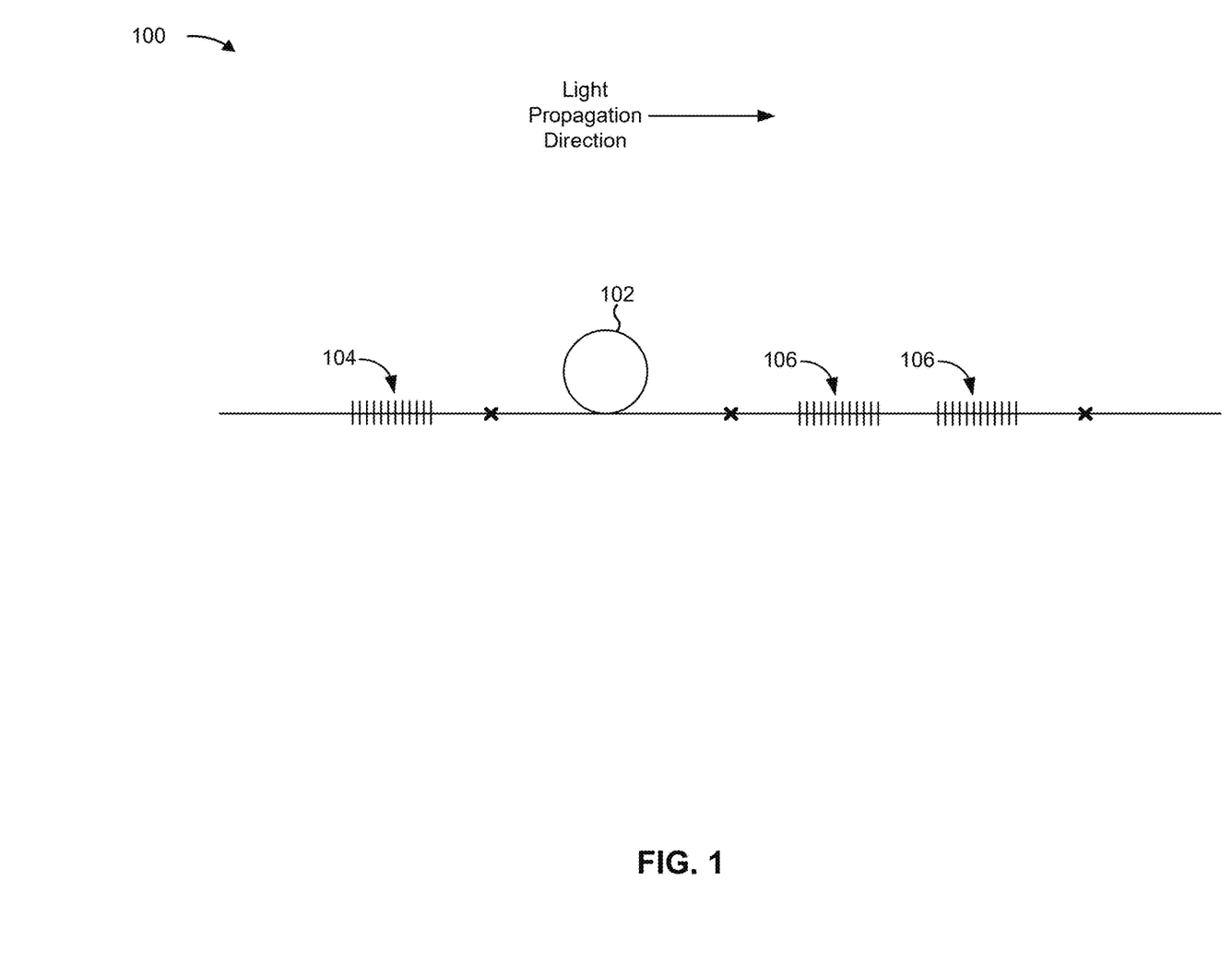
FIG. 1 is a diagram of an example fiber oscillator.

FIG. 1 is a diagram of an example fiber oscillator 100 (e.g., for a kilowatt laser). As shown in FIG. 1, the fiber oscillator 100 may include an active fiber 102, one or more high-reflectivity mirrors 104, and multiple output coupler mirrors 106. The one or more high-reflectivity mirrors 104 and the multiple output coupler mirrors 106 may form an optical cavity (i.e., an optical resonator) with the active fiber 102 (e.g., for generating laser light). As described herein, the optical cavity may be configured to generate a signal having a total optical power that is distributed into multiple different center wavelengths. In particular, respective optical powers of signals of the multiple different center wavelengths may individually be below a corresponding SRS threshold (e.g., the optical power associated with each center wavelength is below an SRS threshold for that center wavelength), while the total optical power is above an SRS threshold of any single center wavelength. An "SRS threshold" may be an optical power associated with an SRS level (e.g., an optical power at which SRS begins to occur or an optical power below which SRS is at an acceptable level). In this way, the fiber oscillator 100 may have improved optical power and reduce or suppress generation of SRS.

The active fiber 102 may be an optical fiber through which light experiences optical gain (e.g., a gain spectrum of the active fiber includes the center wavelengths and/or the reflection spectrums of the output coupler mirrors and/or the high-reflectivity mirrors). For example, a core of the active fiber 102 may be doped with rare-earth ions, such as ytterbium ions and/or erbium ions. The active fiber 102 may be configured to receive pump light from one or more optical sources. The active fiber 102 may have a first end and a second end, and light may propagate in a forward direction through the active fiber 102 from the first end to the second end. The first end of the active fiber 102 may be coupled (e.g., spliced) to the high-reflectivity mirror(s) 104, and the second end of the active fiber 102 may be coupled (e.g., spliced) to the output coupler mirrors 106. For example, the first end of the active fiber 102 may be spliced to an optical fiber that includes the high-reflectivity mirror(s) 104, and the second end of the active fiber 102 may be spliced to an optical fiber that include the output coupler mirrors 106. In some implementations, the high-reflectivity mirror(s) 104 may be formed in a continuous optical fiber (e.g., in which there are no fiber splices between the high-reflectivity mirror(s) 104). Additionally, or alternatively, the output coupler mirrors 106 may be formed in a continuous optical fiber (e.g., in which there are no fiber splices between the output coupler mirrors 106).

The high-reflectivity mirror(s) 104 may be highly reflective mirrors. For example, reflectivities of the high-reflectivity mirrors 104 may be greater than or equal to 90%. In some implementations, the high-reflectivity mirror(s) 104 are fiber Bragg gratings (FBGs), another type of fiber-based mirrors, or coated mirrors. For example, the high-reflectivity mirror(s) 104 may be highly reflective (e.g., ≥90% reflectivity) FBGs. First reflectivities of the high-reflectivity mirror(s) 104 may be greater than second reflectivities of the output coupler mirrors 106 (e.g., the output coupler mirrors 106 may be low reflectivity mirrors). For example, reflectivities of the output coupler mirrors 106 may be less than or equal to 50%. In some implementations, the output coupler mirrors 106 are FBGs, another type of fiber-based mirrors, or coated mirrors. For example, the output coupler mirrors 106 may be output coupler (e.g., ≤50% reflectivity) FBGs. The high-reflectivity mirror(s) 104 and the output coupler mirrors 106 may be wavelength selective (e.g., reflectivities of the high-reflectivity mirror(s) 104 and the output coupler mirrors 106 may be wavelength selective).

The output coupler mirrors 106 may have respective center wavelengths that are different. For example, the center wavelength of each output coupler mirror 106 may be different from the center wavelength of each of the other output coupler mirrors 106. Moreover, the output coupler mirrors 106 may have respective reflection spectrums that are different. For example, the reflection spectrum of each output coupler mirror 106 may be different from the reflection spectrum of each of the other output coupler mirrors 106. In some implementations, the respective reflection spectrums of the output coupler mirrors 106 may be non-overlapping, as described in connection with FIG. 2. In some implementations, a difference between a center wavelength of a first output coupler mirror 106 and a center wavelength of a second output coupler mirror 106 may be several nanometers (nm). In other words, the respective center wavelengths of the output coupler mirrors 106 may be within several nanometers of each other. Moreover, a center wavelength and/or a reflection spectrum for an output coupler mirror 106 may be selected to avoid an SRS threshold, as well as to maximize a total optical power of the fiber oscillator 100.

In some implementations, a quantity of output coupler mirrors 106 of the fiber oscillator 100 may be greater than a quantity of the high-reflectivity mirrors 104 of the fiber oscillator 100. For example, the fiber oscillator 100 may include a single high-reflectivity mirror 104 and at least two output coupler mirrors 106. Here, the single high-reflectivity mirror 104 may provide a relatively broad reflection spectrum bandwidth, and the output coupler mirrors 106 may have relatively narrow reflection spectrum bandwidths. For example, the respective center wavelengths and reflection spectrums of the output coupler mirrors 106 may be within the reflection spectrum bandwidth of the single high-reflectivity mirror 104. In some implementations, the broad reflection spectrum bandwidth of the high-reflectivity mirror 104 may be provided by multiple high-reflectivity mirrors 104 (e.g., with different reflection spectrums). For example, the multiple high-reflectivity mirrors 104 may have adjacent reflection spectrums that, in combination, encompass the respective center wavelengths and reflection spectrums of the output coupler mirrors 106.

As indicated above, FIG. 1 is provided as an example. Other examples may differ from what is described with regard to FIG. 1.

Figure 2:
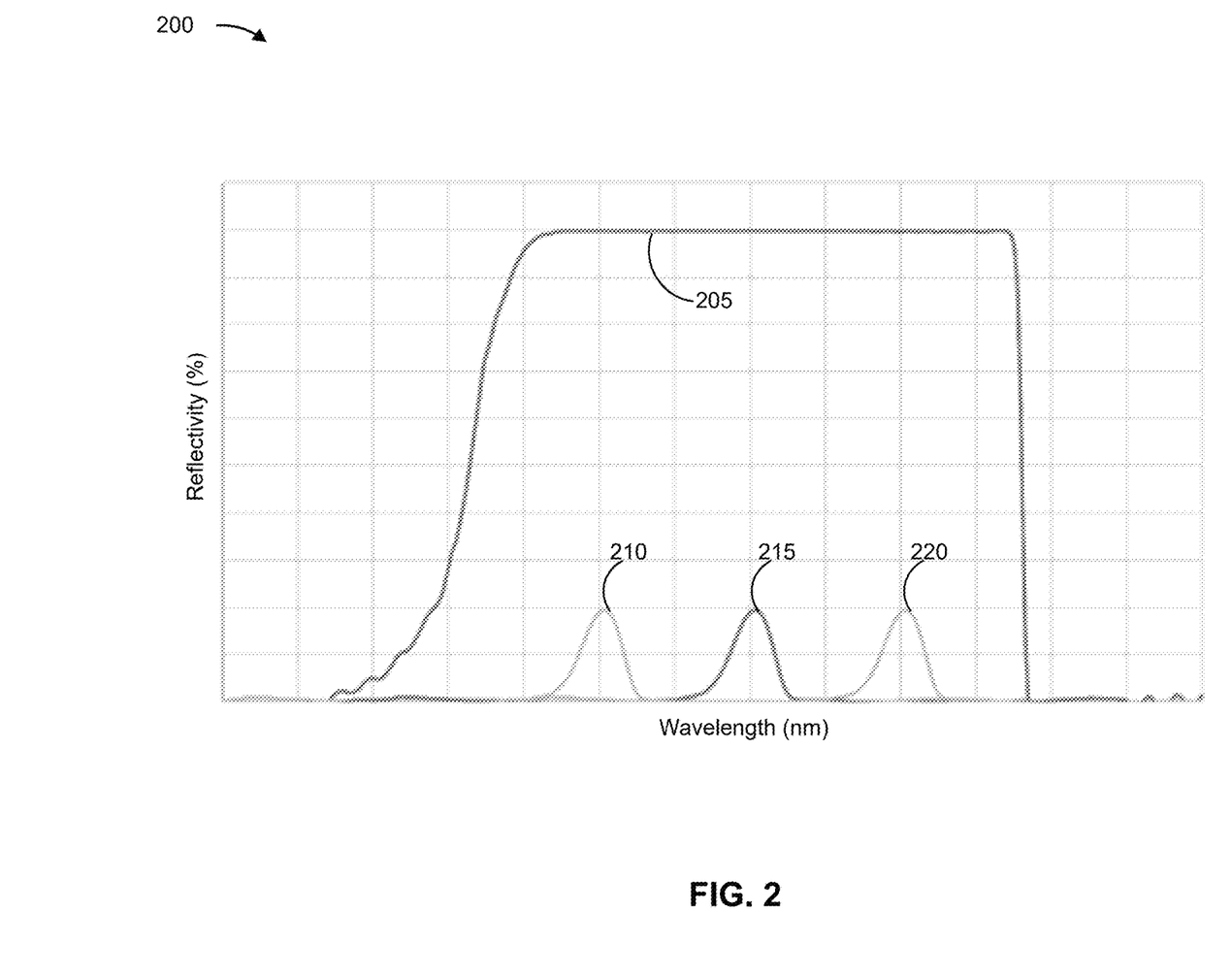
FIG. 2 is a diagram of an example plot showing a relationship between reflectivity spectrums of mirrors of the fiber oscillator of FIG. 1.

FIG. 2 is a diagram of an example plot 200 showing a relationship between reflectivity spectrums of mirrors of the fiber oscillator 100. In particular, plot 200 relates to an implementation of the fiber oscillator 100 that includes a single high-reflectivity mirror 104 and multiple (e.g., three) output coupler mirrors 106, as described in connection with FIG. 1. A reflectivity spectrum of the high-reflectivity mirror 104 is shown by line 205, and reflectivity spectrums of the output coupler mirrors 106 are shown by lines 210, 215, and 220, respectively.

As shown in FIG. 2, and as described in connection with FIG. 1, the respective center wavelengths and the respective reflection spectrums of the multiple output coupler mirrors 106 are included within the reflection spectrum (e.g., a high-reflectivity bandwidth) of the single high-reflectivity mirror 104. That is, the reflection spectrum of the high-reflectivity mirror 104 includes the respective center wavelengths and the respective reflection spectrums of the multiple output coupler mirrors 106. Furthermore, as shown, the respective center wavelengths of the output coupler mirrors 106 may be different wavelengths, and the respective reflection spectrums of the multiple output coupler mirrors 106 may be non-overlapping.

As indicated above, FIG. 2 is provided as an example. Other examples may differ from what is described with regard to FIG. 2.

Figure 3:
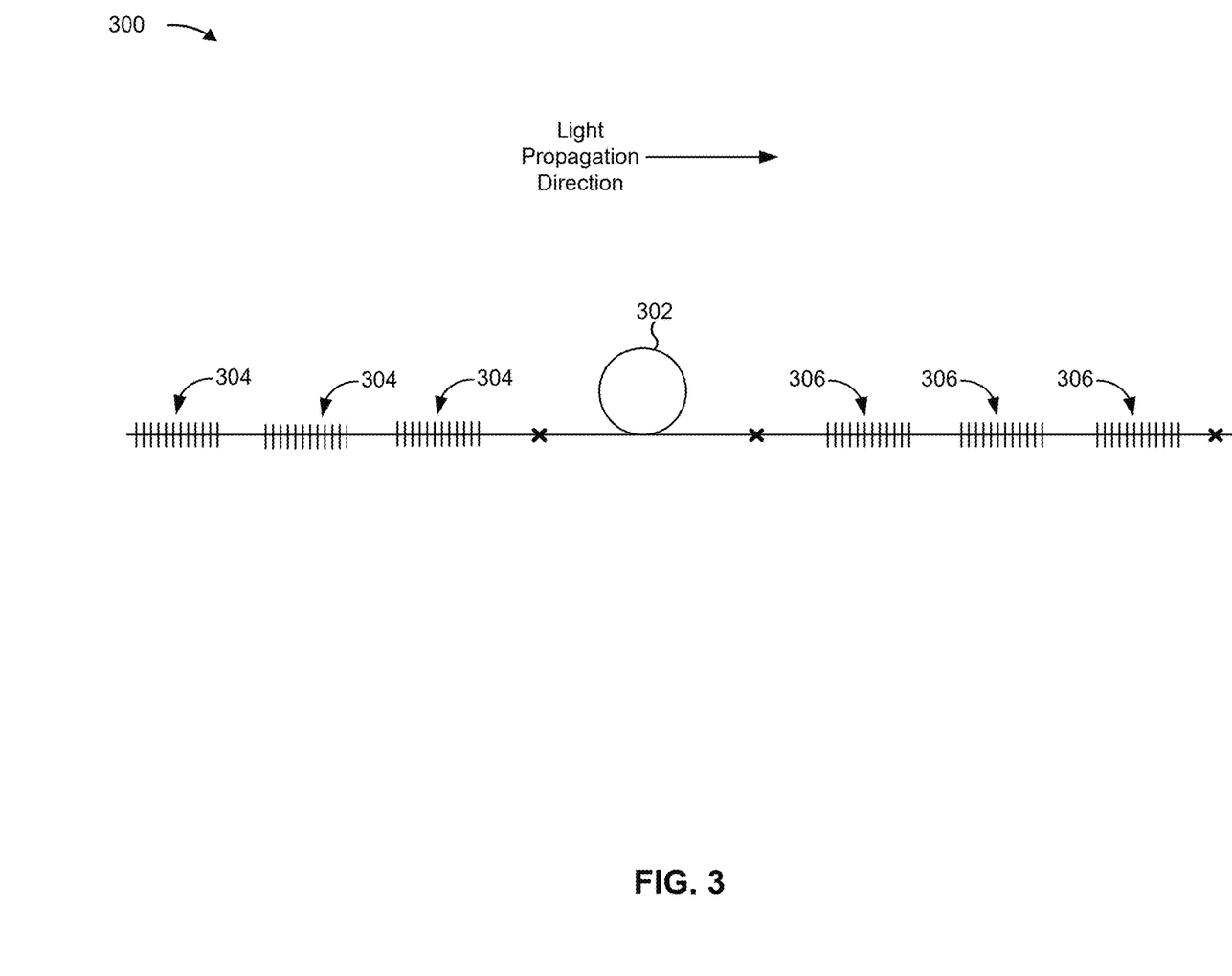
FIG. 3 is a diagram of an example fiber oscillator.

FIG. 3 is a diagram of an example fiber oscillator 300 (e.g., for a kilowatt laser). As shown in FIG. 3, the fiber oscillator 300 may include an active fiber 302, multiple high-reflectivity mirrors 304, and multiple output coupler mirrors 306. The multiple high-reflectivity mirrors 304 and the multiple output coupler mirrors 306 may form an optical cavity (i.e., an optical resonator) with the active fiber 302 (e.g., for generating laser light). As described herein, the optical cavity may be configured to generate a signal having a total optical power that is distributed into multiple different center wavelengths. For example, respective optical powers of signals of the multiple different center wavelengths may individually be below a corresponding SRS threshold, while the total optical power is above an SRS threshold of any one of the multiple different center wavelengths (or above each of the SRS thresholds of all of the multiple different center wavelengths individually).

The active fiber 302, the high-reflectivity mirrors 304, and the output coupler mirrors 306 may be similar to the active fiber 102, the high-reflectivity mirror(s) 104, and the output coupler mirrors 106 described in connection with FIG. 1. For example, the output coupler mirrors 306 may have respective center wavelengths that are different. Moreover, the output coupler mirrors 306 may have respective reflection spectrums that are different (e.g., that are non-overlapping).

A quantity of the high-reflectivity mirrors 304 may be the same as a quantity of the output coupler mirrors 306, such that the high-reflectivity mirrors 304 and the output coupler mirrors 306 form multiple mirror pairs. Here, a mirror pair may include a high-reflectivity mirror 304 and an output coupler mirror 306. The pairings for the mirror pairs may be according to any number of configurations; however, in some implementations, the pairings for the mirror pairs may be according to an order of the high-reflectivity mirrors 304 and the output coupler mirrors 306 relative to the active fiber 302. For example, with respect to a forward light propagation direction from a first end to a second end of the active fiber 302, a first mirror pair may include a first-in-order high-reflectivity mirror 304 coupled to the first end of the active fiber 302 and a first-in-order output coupler mirror 306 coupled to the second end of the active fiber 302 in the forward light propagation direction; a second mirror pair may include a second-in-order high-reflectivity mirror 304 coupled to the first end of the active fiber 302 and a second-in-order output coupler mirror 306 coupled to the second end of the active fiber 302 in the forward light propagation direction; and so forth.

For each mirror pair, an output coupler mirror 306 of the mirror pair may match with a high-reflectivity mirror 304 of the mirror pair. That is, a first center wavelength and reflection spectrum of the output coupler mirror 306 may match with a second center wavelength and reflection spectrum of the high-reflectivity mirror 304.

As indicated above, FIG. 3 is provided as an example. Other examples may differ from what is described with regard to FIG. 3.

Figure 4:
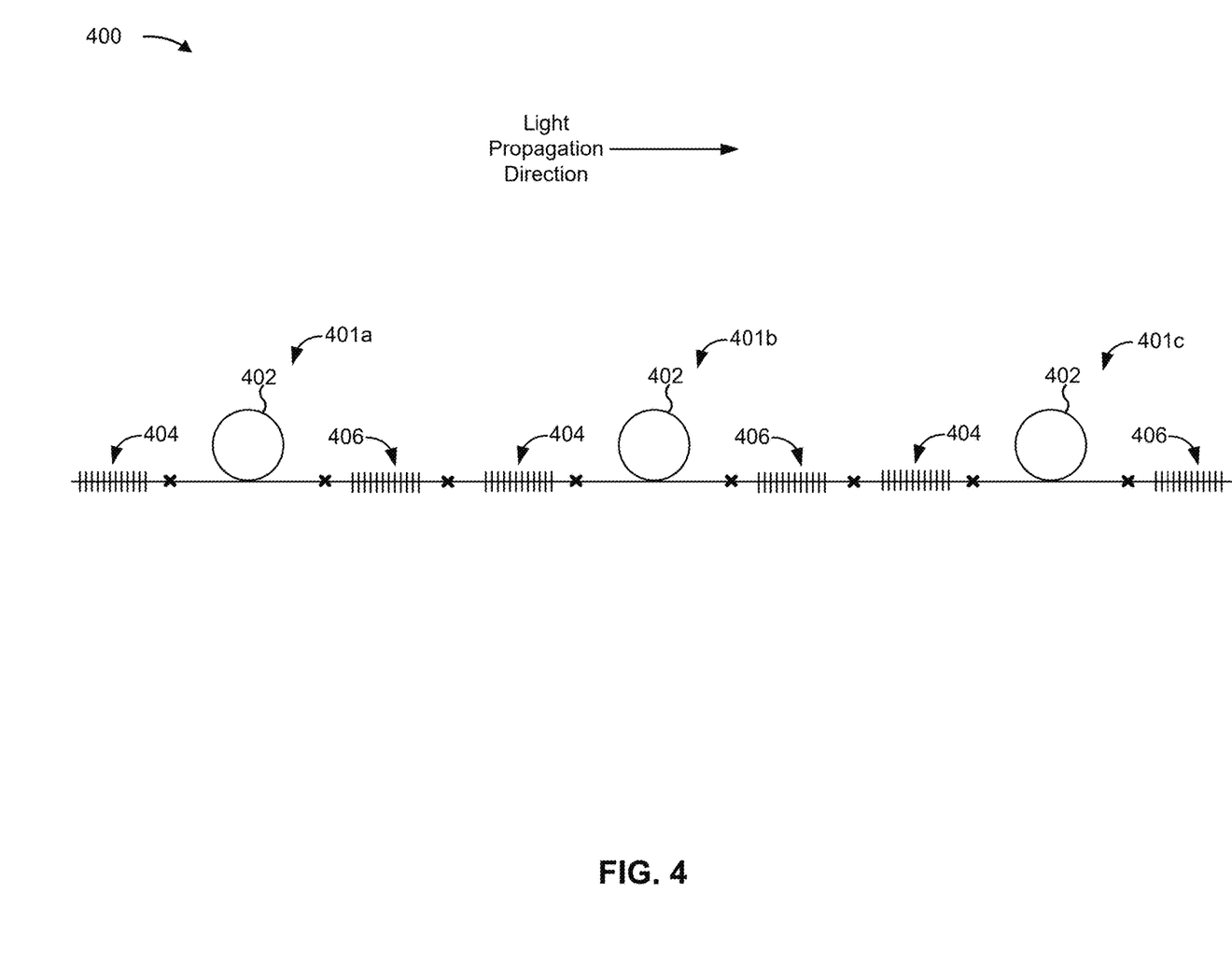
FIG. 4 is a diagram of an example fiber oscillator system.

FIG. 4 is a diagram of an example fiber oscillator system 400 (e.g., for a kilowatt laser). As shown in FIG. 4, the fiber oscillator system 400 may include multiple fiber oscillators 401a, 401b, and 401c (referred to collectively as fiber oscillators 401 or individually as a fiber oscillator 401). Although the fiber oscillator system 400 is illustrated with three fiber oscillators, the fiber oscillator system 400 may include two or more fiber oscillators. As shown, each fiber oscillator 401 may include an active fiber 402, a high-reflectivity mirror 404 (or multiple high-reflectivity mirrors 404), and an output coupler mirror 406 (or multiple output coupler mirrors 406). For each fiber oscillator 401, the high-reflectivity mirror 404 and the output coupler mirror 406 may form an optical cavity (i.e., an optical resonator) with the active fiber 402 (e.g., for generating laser light). As described herein, the optical cavities may be configured to generate a signal having an optical power that is distributed into multiple different center wavelengths. For example, respective optical powers of signals of the multiple different center wavelengths may individually be below a corresponding SRS threshold, while the total optical power is above an SRS threshold of any one of the multiple different center wavelengths (or above each of the SRS thresholds of all of the multiple different center wavelengths individually).

The active fibers 402, the mirrors 404, and the output coupler mirrors 406 may be similar to the active fiber 102, the high-reflectivity mirror(s) 104, and the output coupler mirrors 106 described in connection with FIG. 1. For example, the output coupler mirrors 406 may have respective center wavelengths that are different. Moreover, the output coupler mirrors 406 may have respective reflection spectrums that are different (e.g., that are non-overlapping). In some implementations, the fiber oscillators 401 may be configured to generate respective signals at different wavelengths. For example, the active fibers 402 of the fiber oscillators 401 may include different materials from each other (e.g., different rare-earth ions and/or different doping levels, or different gain spectrums). In some implementations, a difference between a center wavelength of a first output coupler mirror 406/active fiber 402 and a center wavelength of a second output coupler mirror 406/active fiber 402 may be several nanometers, tens of nanometers, or hundreds of nanometers.

In some implementations, the active fibers 402 of the fiber oscillators 401 may be respectively (e.g., individually) pumped by different optical sources (e.g., pump lasers). Here, for example, the fiber oscillator system 400, or a system that includes the fiber oscillator system 400, may include multiple optical sources to respectively pump the active fibers 402. In this way, a signal of the fiber oscillator system 400 may be independently modulated at different wavelengths. In some implementations, the active fibers 402 of the fiber oscillators 401 may be pumped by a single optical source (e.g., by the same optical source). Here, for example, the fiber oscillator system 400, or a system that includes the fiber oscillator system 400, may include an optical source to pump the active fibers 402.

As indicated above, FIG. 4 is provided as an example. Other examples may differ from what is described with regard to FIG. 4.

Figure 5:
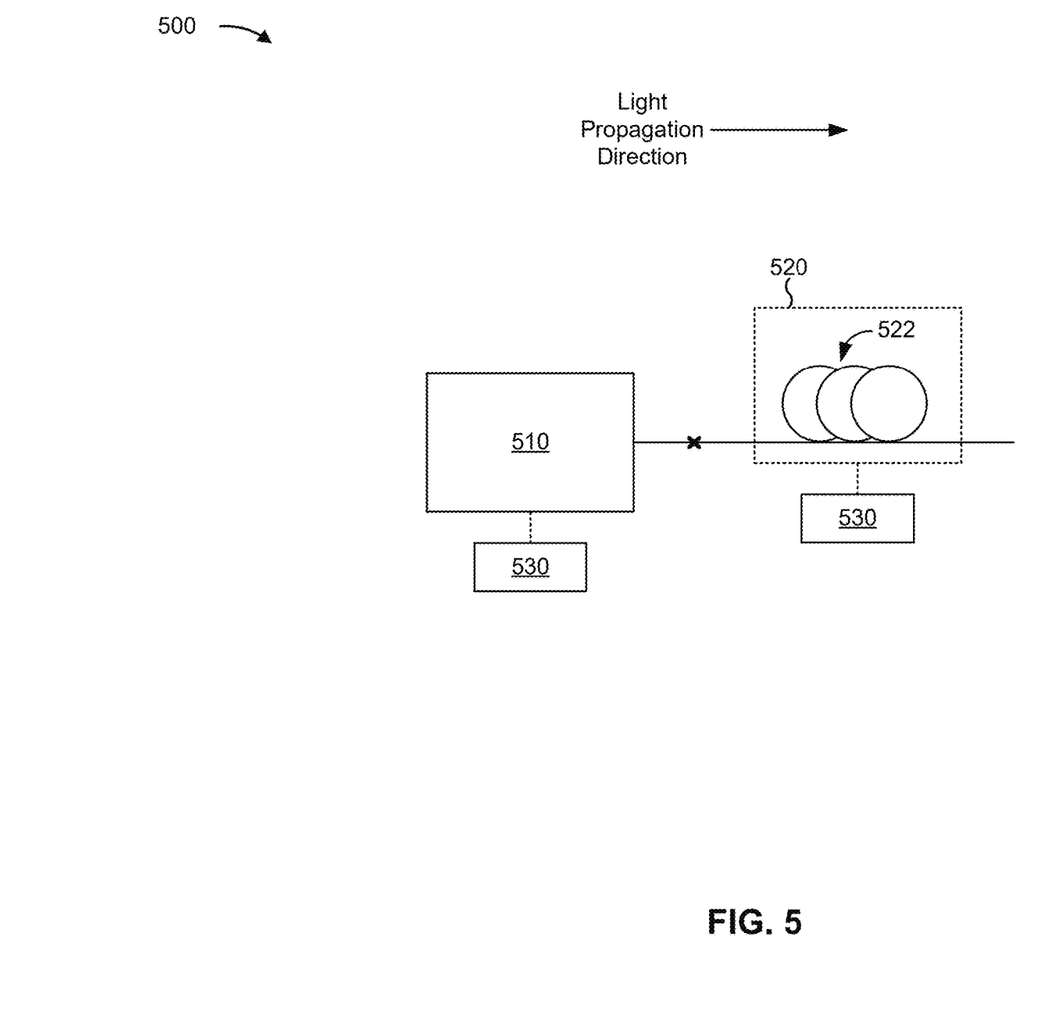
FIG. 5 is a diagram of an example fiber amplifier system.

FIG. 5 is a diagram of an example fiber amplifier system 500. As shown, the fiber amplifier system 500 may include a seed oscillator 510 and a fiber amplifier 520. The seed oscillator 510 may include the fiber oscillator 100, the fiber oscillator 300, or the fiber oscillator system 400. The fiber amplifier 520 may include one or more active fibers 522, which may be similar to the active fibers described herein. However, the fiber amplifier 520 does not include mirrors coupled to the active fiber(s) 522 (e.g., the fiber amplifier 520 does not include an optical cavity). The fiber amplifier 520 may be coupled to an output end (e.g., in a forward light propagation direction) of the seed oscillator 510. Thus, the seed oscillator 510 may generate a signal having an optical power that is distributed into multiple different center wavelengths, as described herein, and the seed oscillator 510 may provide the signal to the fiber amplifier 520. In this way, the fiber amplifier system 500 may reduce or suppress generation of SRS. The fiber amplifier 520 may receive the signal from the seed oscillator 510, and the fiber amplifier 520 may amplify the signal (e.g., by pumping the signal in the active fiber(s) 522) and output the amplified signal (e.g., as a laser beam).

As shown, the fiber amplifier system 500 may include one or more optical sources 530 to pump the active fiber(s) of the seed oscillator 510 and/or the active fiber(s) of the fiber amplifier 520. For example, the fiber amplifier system 500 may include one or more optical sources 530 for pumping active fiber(s) of the seed oscillator 510 (e.g., as described in connection with FIG. 4), and the fiber amplifier system 500 may include one or more optical sources 530 for pumping the active fiber(s) 522 of the fiber amplifier 520. The optical sources 530 for the active fiber(s) of the seed oscillator 510 may be optically connected (e.g., by optical fiber) to the active fiber(s). The optical sources 530 for the active fiber(s) 522 of the fiber amplifier 520 may be optically connected (e.g., by optical fiber) to the active fiber(s) 522.

As indicated above, FIG. 5 is provided as an example. Other examples may differ from what is described with regard to FIG. 5.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fiber amplifier system, comprising:
a fiber oscillator, comprising:
an active fiber having a first end and a second end, wherein the active fiber is to receive pump light from one or more optical sources;
one or more high-reflectivity mirrors coupled to the first end of the active fiber; and
multiple output coupler mirrors coupled to the second end of the active fiber, wherein the one or more high-reflectivity mirrors and the multiple output coupler mirrors form an optical cavity with the active fiber for generating laser light,
wherein the multiple output coupler mirrors have respective center wavelengths that are different,
wherein the multiple output coupler mirrors have respective reflection spectrums that are different,
wherein the optical cavity is to generate a signal that is to have a total optical power that is distributed into multiple different center wavelengths, and
wherein respective optical powers of signals of the multiple different center wavelengths are individually to be below a corresponding stimulated Raman scattering (SRS) threshold, and the total optical power is to be above an SRS threshold of any one of the multiple different center wavelengths; and
a fiber amplifier coupled to an output end of the fiber oscillator.

2. The fiber amplifier system of claim 1, wherein the one or more high-reflectivity mirrors include a single high-reflectivity mirror.

3. The fiber amplifier system of claim 2, wherein the respective center wavelengths and the respective reflection spectrums of the multiple output coupler mirrors are included within a reflection spectrum of the single high-reflectivity mirror.

4. The fiber amplifier system of claim 1, wherein the one or more high-reflectivity mirrors include multiple high-reflectivity mirrors, and
wherein a quantity of the multiple high-reflectivity mirrors is the same as a quantity of the multiple output coupler mirrors, such that the multiple high-reflectivity mirrors and the multiple output coupler mirrors form multiple mirror pairs.

5. The fiber amplifier system of claim 4, wherein a mirror pair of the multiple mirror pairs includes a high-reflectivity mirror of the multiple high-reflectivity mirrors and an output coupler mirror of the multiple output coupler mirrors, and
wherein a first center wavelength and reflection spectrum of the output coupler mirror matches a second center wavelength and reflection spectrum of the high-reflectivity mirror.

6. The fiber amplifier system of claim 1, wherein the respective reflection spectrums of the multiple output coupler mirrors are non-overlapping.

7. The fiber amplifier system of claim 1, wherein the one or more high-reflectivity mirrors and the multiple output coupler mirrors are fiber Bragg gratings or coated mirrors.

8. The fiber amplifier system of claim 1, wherein first reflectivities of the one or more high-reflectivity mirrors are greater than second reflectivities of the multiple output coupler mirrors.

9. A fiber oscillator, comprising:
an active fiber having a first end and a second end,
wherein the active fiber is to receive pump light from one or more optical sources;
a high-reflectivity mirror coupled to the first end of the active fiber; and
multiple output coupler mirrors coupled to the second end of the active fiber,
wherein the high-reflectivity mirror and the multiple output coupler mirrors form an optical cavity with the active fiber,
wherein the multiple output coupler mirrors have respective center wavelengths that are different,
wherein the high-reflectivity mirror has a reflection spectrum that includes respective reflection spectrums of the multiple output coupler mirrors,
wherein the optical cavity is to generate a signal that is to have a total optical power that is distributed into multiple different center wavelengths, and
wherein respective optical powers of signals of the multiple different center wavelengths are individually to be below a corresponding stimulated Raman scattering (SRS) threshold, and the total optical power is to be above an SRS threshold of any one of the multiple different center wavelengths.

10. The fiber oscillator of claim 9, wherein the respective reflection spectrums of the multiple output coupler mirrors are different.

11. The fiber oscillator of claim 10, wherein the respective reflection spectrums of the multiple output coupler mirrors are non-overlapping.

12. The fiber oscillator of claim 9, wherein the fiber oscillator is included in a fiber amplifier system with a fiber amplifier that is coupled to an output end of the fiber oscillator.

13. A fiber oscillator, comprising:
an active fiber having a first end and a second end,
wherein the active fiber is to receive pump light from one or more optical sources;
one or more high-reflectivity mirrors coupled to the first end of the active fiber; and
multiple output coupler mirrors coupled to the second end of the active fiber,
wherein the one or more high-reflectivity mirrors and the multiple output coupler mirrors form an optical cavity with the active fiber,
wherein the optical cavity is to generate a signal that is to have a total optical power that is distributed into multiple different center wavelengths, and
wherein respective optical powers of signals of the multiple different center wavelengths are individually to be below a corresponding stimulated Raman scattering (SRS) threshold, and the total optical power is to be above an SRS threshold of any one of the multiple different center wavelengths.

14. The fiber oscillator of claim 13, wherein the multiple output coupler mirrors have respective center wavelengths that are different, and
wherein the multiple output coupler mirrors have respective reflection spectrums that are non-overlapping.

15. The fiber oscillator of claim 14, wherein the one or more high-reflectivity mirrors include a single high-reflectivity mirror, and
wherein the respective center wavelengths and the respective reflection spectrums of the multiple output coupler mirrors are included within a reflection spectrum of the single high-reflectivity mirror.

16. The fiber oscillator of claim 13, wherein the fiber oscillator is included in a fiber amplifier system with a fiber amplifier that is coupled to an output end of the fiber oscillator.

17. The fiber amplifier system of claim 1, wherein reflectivities of the multiple output coupler mirrors are less than or equal to 50%.

18. The fiber amplifier system of claim 1, wherein reflectivities of the one or more high-reflectivity mirrors are greater than or equal to 90%.

19. The fiber amplifier system of claim 1, further comprising:
another fiber oscillator,
wherein the other fiber oscillator is pumped by a different optical source than the fiber oscillator.

20. The fiber oscillator of claim 13, wherein a quantity of the multiple output coupler mirrors is greater than a quantity of the one or more high-reflectivity mirrors.

* * * * *